United States Patent [19]

Kolk

[11] 4,006,257
[45] Feb. 1, 1977

[54] VACUUM TREATING FRUIT PIECES IN AQUEOUS SOLUTIONS CONSISTING OF SODIUM BISULFITE OR SODIUM SULFITE AND CITRIC ACID

[76] Inventor: Clarence H. Kolk, 242 New Ranch Park, Clearwater, Fla. 33515

[22] Filed: Aug. 7, 1975

[21] Appl. No.: 602,899

[52] U.S. Cl. .............................. 426/269; 426/270; 426/321
[51] Int. Cl.² ......................................... A21D 4/00
[58] Field of Search .......... 426/264, 268, 270, 310, 426/323, 321, 335, 254, 255, 259, 534, 539, 541, 544, 546, 615

[56] References Cited

UNITED STATES PATENTS

| | | | |
|---|---|---|---|
| 2,475,838 | 7/1949 | Johnson | 426/269 |
| 2,702,248 | 2/1955 | Guadagni | 426/269 |
| 3,025,169 | 3/1962 | Guadagni | 426/270 |

*Primary Examiner*—Norman Yudkoff
*Assistant Examiner*—Martin G. Mullen
*Attorney, Agent, or Firm*—Glenn B. Morse

[57] ABSTRACT

Fruit is prepared for refrigerated storage by cutting the fruit into convenient pieces, and then subjecting the fruit to soaking under vacuum in a solution containing sodium bisulfite or sodium sulfite and citric acid in definite ranges. These ranges are preferably inversely related in a substantially straight-line relationship, so that the high end of one range is used in conjunction with the low end of the other. The fruit pieces are also preferably immersed in a preliminary holding solution containing sodium bisulfite or sodium sulfite and table salt prior to the soaking. Fruit prepared in this way can be held indefinitely under ordinary refrigeration without freezing. The process is particularly suitable for apples.

5 Claims, No Drawings

VACUUM TREATING FRUIT PIECES IN AQUEOUS SOLUTIONS CONSISTING OF SODIUM BISULFITE OR SODIUM SULFITE AND CITRIC ACID

BACKGROUND OF THE INVENTION

Commercial preparation of fruit preparatory to canning or using it in baked goods has always been an urgent matter, in view of the tendency of the fruit to discolor and spoil rapidly. Ordinary refrigeration has not been considered as sufficient to halt or significantly retard this tendency, and even freezing has required considerable preparatory processing in order to preserve the taste and appearance of the fruit.

It has been common practice to soak fruit, particularly pieces of apples, in a solution containing sodium bisulfite and citric acid prior to freezing, in order to prolong the storage life of the frozen pieces. Wide variations in the concentration of the bisulfite and the citric acid have been tried, but no process has been found which has been considered capable of doing anything more than extending the storage life of the frozen product. It has not been recognized that possible ranges of these chemicals exist which would eliminate the need for freezing, and also substantially further prolong the storage life of the frozen product.

SUMMARY OF THE INVENTION

In the preferred procedure, fruit is cut into pieces of convenient size, and placed in a preliminary holding solution containing approximately 1200 parts of sodium bisulfite and 12,000 parts of ordinary table salt per million parts of water (by weight). The water is sufficient to submerge the mass of fruit pieces. The fruit is preferably held for 5 minutes to one-half hour in this first solution. In the preliminary soaking, the fruit pieces will pick up approximately 50 parts of the sodium bisulfite per million parts of the juice of the pieces. The pieces are then transferred directly to a vessel capable of the application of vacuum to its contents. The fruit is soaked in this vessel in a solution containing sodium bisulfite in a concentration of approximately 600 parts of the sodium bisulfite per million parts of water, which must produce a range of between 192 and 256 parts of the sodium bisulfite per million parts of the juice of the fruit (by weight) after processing has been completed, including that absorbed in the preliminary immersion. The solution also contains citric acid in a concentration of approximately 1200 parts of the citric acid per million parts of the water, which must impart a range of between 3½ to 4½ milli-liters of the citric acid to hundred grams of the juice of the fruit after processing. This degree of concentration includes the citric acid already present in the fruit. The soaking continues in the container for 2 to 3 minutes under a vacuum of approximately 30 inches of mercury. The fruit is then drained and packed according to convenience for refrigerated storage.

DESCRIPTION OF THE PREFERRED PROCEDURES

It appears that this process is particularly well suited for the preparation of apples for storage under ordinary refrigeration, or for increasing the storage life of the apple pieces that have been frozen after processing. The apples are first cut into pieces of a size convenient for the particular use for which they are intended. These pieces are then preferably placed in a holding solution containing approximately 1200 parts of sodium bisulfite per million parts of water, and also containing 12,000 parts of table salt per million parts of water (by weight). The ranges of the chemicals in the holding solution are approximate. The pieces are preferably held in the holding solution for five minutes to one-half hour, and then transferred directly to a container capable of sustaining high vacuum. Enough water is present in the vacuum container to completely submerge the apple pieces, and sodium bisulfite is present in this water in a concentration of approximately 600 parts (by weight) per million parts of water. The soaking solution also contains citric acid in a concentration of approximately 1200 parts (by weight) per million parts of water. Salt is preferably added in approximately 6000 parts per million parts of the water. The container is placed under a vacuum of approximately 30 inches of mercury for two to three minutes, after which the apple pieces are drained and packaged for ordinary refrigeration. The objective of the vacuum soaking is to impart a concentration of the sodium bisulfite in the juice of the fruit in a range between 192 and 256 parts of the sodium bisulfite (by weight) per million parts of the juice in the fruit (including the amount absorbed in the preliminary immersion) and a concentration of the citric acid of three and one-half to four and one-half milli-liters of citric acid per hundred grams of the juice. The salt range is not significant with regard to the preservation properties of the process, and is used solely for taste characteristics. A sample of the pieces should be taken after processing to determine whether the stated ranges have been imparted to the contents of the container. The test sample is prepared by grinding or mashing a quantity of the fruit pieces, and extracting the juice. The juice is then filtered, and tested for sodium bisulfite concentration by the following procedure:

a. place 25 ml of distilled water in a container, and add 10 ml of the filtered juice
   b. add five drops of liquid starch
   c. use iodine to titrate the sample to where it turns a bright blue
   d. convert the quantity of the iodine required to a reading in terms of sodium sulfite concentration by a standard scale.

The citric acid concentration is determined as follows:
   a. place 10 ml of the filtered juice in a 250 ml flask
   b. dilute with distilled water to produce 250 ml
   c. draw off 100 ml into an Erlenmeyer flask
   d. add .3 ml of phenolphthalein
   e. titrate with sodium hydroxide to just prior to development of a pink color, and determine the reading by standard data If the samples show that the concentrations are on the low side of the range, the time of the vacuum soaking is increased toward the three minute limit on the next batch. If the testing shows the batch to be out of range on the low side, it may be re-processed. If the ranges cannot be obtained in three minutes, more of the chemicals should be added to the solution as indicated. This is to be expected, as they are being withdrawn from the solution as each batch is processed. The solution is re-used, and fortified from a supply source. If the sample is out of range on the high side, the batch should be mixed with subsequent batches processed in lowered concentration, if the time of exposure has been reduced to two minutes without producing results in range.

The time of exposure to the vacuum is influenced also by the degree of ripeness of the fruit, with the riper fruit requiring a time toward the two minute limit. In evaluating the test results, it is preferable that the batch be kept toward the low end of the sodium bisulfite range, and in the middle of the citric acid range for the most desirable product. The next criterion in degree of preference is the maintenance of the ranges in substantially inverse straight-line relationship. The product is still valuable, however, in all combinations within the stated ranges, and is superior to the product of conventional processes.

It has been noted that a decrease in the sodium bisulfite below the stated range produces a tendency for the apple pieces to turn slightly brown, and also induces a release of apple juice from the slices after 30 days in refrigerated storage. A much greater change occurs after 60 days, and the product becomes questionable after 6 months in storage. At the upper extreme of the range, a point is reached where the taste of the apple pieces becomes affected, and the requirements of the FDA with regard to the allowable content of preservatives must be observed.

It may be noted in passing that vitamin C would conceivably be usable in place of the citric acid, but the quantity would be approximately twice as great. The added cost of the vitamin C over the citric acid will normally make this alternative prohibitive. Sodium sulfite may also be used in place of the sodium bisulfite. The sulfite tends to produce a yellowish color to the fruit, which may be desirable in some cases.

Experiments have shown that the process described here in connection with apples is also useful on peaches and cherries, using substantially the same range limits and procedure.

I claim:
1. A method of processing fruit, including cutting the fruit into pieces and soaking the pieces in an aqueous solution of citric acid and a member selected from the group consisting of sodium bisulfite and sodium sulfite, wherein the improvement comprises:
   soaking said pieces under vacuum in an aqueous solution consisting of said member selected from the group consisting of sodium bisulfite and sodium sulfite in a concentration to produce said member selected from the group consisting of sodium bisulfite and sodium sulfite in the juice of said pieces in a range between 192 and 256 parts per million parts of the juice in said pieces by weight, and citric acid in a range between 3½ to 4½ milli-liters per 100 grams of the juice in said pieces including the citric acid that may be present in said fruit,
   draining said pieces, and holding the same for use.
2. A method as defined in claim 1, wherein said soaking is continued for at least 2 minutes, and under a vacuum of approximately 30 inches of mercury.
3. A method as defined in claim 1, wherein said soaking is preceded by the immersion of said pieces in a solution containing table salt in approximately 12,000 parts per million parts by weight of water and a member selected from the group consisting of sodium bisulfite and sodium sulfite in approximately 1,200 parts per million by weight of water.
4. A method as defined in claim 3, wherein said immersion is continued for a period of between five and thirty minutes and said pieces are then transferred directly to said soaking operation.
5. A method as defined in claim 1, wherein said ranges are inversely related on a substantially straight-line basis.

* * * * *